(12) United States Patent
Joung et al.

(10) Patent No.: US 8,982,687 B2
(45) Date of Patent: Mar. 17, 2015

(54) APPARATUS AND METHOD FOR I/Q OFFSET CANCELLATION IN SC-FDMA SYSTEM

(75) Inventors: Jinsoup Joung, Seongnam-si (KR);
Kyeongmin Ha, Seongnam-si (KR);
Seunghwan Ji, Seongnam-si (KR);
Yonghoon Lim, Seoul (KR);
Byungkwan Jang, Yongin-si (KR)

(73) Assignee: Innowireless Co., Ltd. (KR)

( * ) Notice: Subject to any disclaimer, the term of this patent is extended or adjusted under 35 U.S.C. 154(b) by 263 days.

(21) Appl. No.: 13/820,193

(22) PCT Filed: Dec. 30, 2010

(86) PCT No.: PCT/KR2010/009578
§ 371 (c)(1),
(2), (4) Date: Mar. 12, 2013

(87) PCT Pub. No.: WO2012/030028
PCT Pub. Date: Mar. 8, 2012

(65) Prior Publication Data
US 2013/0155833 A1 Jun. 20, 2013

(30) Foreign Application Priority Data

Sep. 3, 2010 (KR) ........................ 10-2010-0086440

(51) Int. Cl.
*H04J 11/00* (2006.01)
*H04J 1/16* (2006.01)
(Continued)

(52) U.S. Cl.
CPC ............... *H04J 1/16* (2013.01); *H04L 27/2647* (2013.01); *H04L 27/3854* (2013.01)
USPC ......................................................... 370/210

(58) Field of Classification Search
CPC ... H04L 1/1829; H04L 1/1893; H04L 1/1861; H04L 1/1864; H04W 72/1278
See application file for complete search history.

(56) References Cited

U.S. PATENT DOCUMENTS

2002/0051433 A1* 5/2002 Affes et al. .................... 370/335
2009/0231990 A1* 9/2009 Lee et al. ....................... 370/207
(Continued)

FOREIGN PATENT DOCUMENTS

KR  1020080050221  6/2008
WO  2006090438   8/2006

OTHER PUBLICATIONS

S. B. Ryu, et al., ICI and Compensation Algorithm against Frequency Offset and Phase Noise in SC-FDMA System with Comb Type Pilot, Journal of KIEES, vol. 2, 2010, pp. 399-407.
(Continued)

*Primary Examiner* — Jung-Jen Liu
(74) *Attorney, Agent, or Firm* — Cantor Colburn LLP (57) ABSTRACT

The present invention relates to an apparatus and a method for eliminating I/Q offset in a receiver of a SC-FDMA system which improves performance of the system by accurate measurement and cancellation of I/Q offset in a receiver of a SC-FDMA system operating in a 3GPP LTE uplink. An apparatus for eliminating I/Q offset in a receiver of the SC-FDMA system constituting the receiver of the SC-FDMA system includes: a linear interpolation channel estimation unit for estimating channel using demodulation reference symbol (DMRS) that is a training sequence (X) corresponding to the discrete Fourier transformed signal (Y) that has passed through frame sync acquisition, frequency compensation and cyclic prefix elimination; a signal regeneration/cancellation unit for calculating I/Q offset (D=Y−Y') by subtracting the discrete Fourier transformed signal (Y) from the ideal discrete Fourier transformed signal (Y'=H'X) generated by using channel coefficient (H'), that is an output of the linear interpolation channel estimation unit, and the DMRS that is the training sequence (X); and an I/Q offset measurement/cancellation unit for generating I/Q offset-free signal $(Y_{NoDC}=Y-D')$ by subtracting I/Q offset (D') having corrected phase and power of the I/Q offset (D=Y−Y') from the discrete Fourier transformed signal (Y).

18 Claims, 3 Drawing Sheets

(51) Int. Cl.
*H04L 27/26* (2006.01)
*H04L 27/38* (2006.01)

(56) References Cited

U.S. PATENT DOCUMENTS

2010/0080114 A1* 4/2010 Ratnam et al. ............... 370/210
2011/0176502 A1* 7/2011 Chung et al. ................. 370/329

OTHER PUBLICATIONS

International Search Report—PCT/KR2010/009578 dated Oct. 4, 2011.
Agilent Genesys, Agilent Technologies, Catalogue, 2008.
Rumney, 3GPP LTE: Introducing Single-Carrier FDMA, Agilent Technologies, 2008, pp. 1-10.

* cited by examiner

Fig. 1

* N < M
* S-to-P: Serial-to-Parallel
* P-to-S: Parallel-to-Serial

Fig. 2

Δf=7.5kHz
frequency shift

Fig. 3

APPARATUS AND METHOD FOR I/Q OFFSET CANCELLATION IN SC-FDMA SYSTEM

TECHNICAL FIELD

The present invention relates to an apparatus and a method for eliminating I/Q offset in a receiver of a single carrier-frequency division multiple access (referred to as 'SC-FDMA' hereinafter) system, more particularly, to an apparatus and a method for eliminating I/Q offset in a receiver of a SC-FDMA system which improves performance of the system by accurate measurement and cancellation of I/Q offset in a receiver of SC-FDMA system operating in a 3GPP LTE/LTE-Advanced uplink etc.

BACKGROUND ART

It is well known that the Long Term Evolution (referred to as 'LTE' hereinafter), so named because it evolutionized the 3rd generation (referred to as '3G' hereinafter) mobile communication in long term perspective, is one of the strong candidates for the 4th generation mobile communication technology in parallel with the Wibro Evolution. This LTE is based on the 'Release 8' that is finalized as a standard specification in December 2008 by the 3rd Generation Partnership Project (referred to as '3GPP' hereinafter) which standardizes 3rd mobile wireless communication; the channel bandwidth is from 1.4 MHz to 20 MHz, and the maximum transmission speed of the downlink is 100 Mbps based on 20 MHz bandwidth, and the maximum transmission speed of the uplink is 50 MHz. Wireless multiple access and multiplexing method is based on orthogonal frequency-division multiplexing (referred to as 'OFDM' hereinafter), and high speed packet data transmission method is based on multiple-input and multiple-out (MIMO). LTE Advanced is an evolutionized version of the above-described LTE, it will be referred to as '3GPP LTE' hereinafter.

Meanwhile, feed-through of a mixer or carrier leakage caused by the I/Q DC offset, therefore I/Q offset should be eliminated properly because it may function as interference in the system and deteriorate the system performance.

In OFDM, the transmitter does not transmit data to DC(0) subcarrier, as a result, the I/Q offset effect appears at the DC subcarrier in the receiver making measurement and cancellation of the I/Q offset very easy.

Meanwhile, at present time, SC-FDMA is adopted to reduce high peak-to-average power ratio (referred to as 'PAPR' hereinafter) that is a disadvantage of OFDM technology in a 3GPP LTE uplink.

Figure 1:
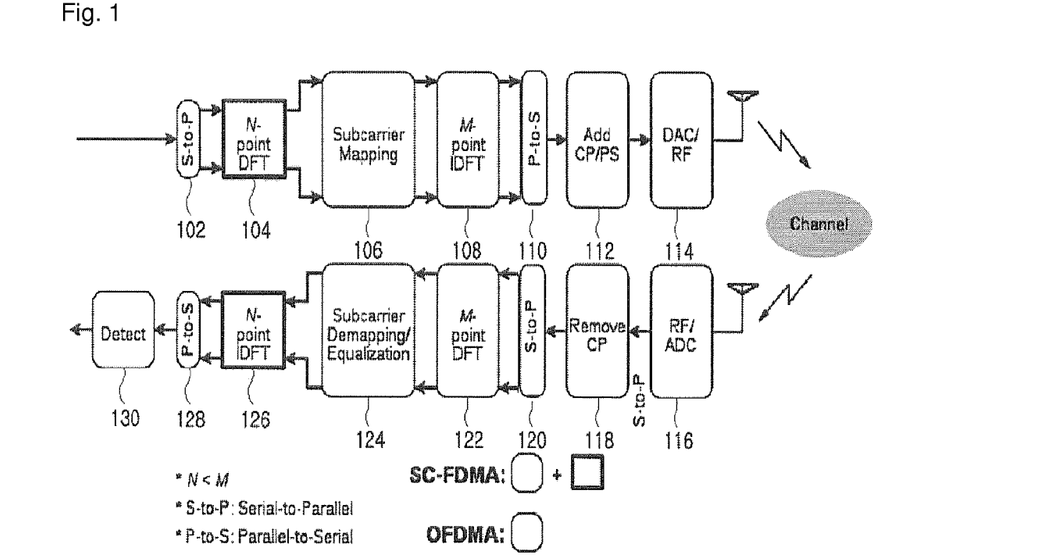
FIG. 1 is an approximate functional block diagram of a transmitter and a receiver of a 3GPP LTE in a conventional uplink.

FIG. 1 presents an approximate functional block diagram of a transmitter and a receiver of a 3GPP LTE in a conventional uplink, wherein the transmitter functions as a terminal while the receiver operate as a part of the base station. As shown in FIG. 1, a transmitter of a 3GPP LTE in a conventional uplink includes a serial to parallel converter 102, a subcarrier mapping module 106, an M-point inverse discrete Fourier transform (referred to as 'IDFT' hereinafter) module 108, a cyclic prefix adding module 110, a parallel to serial converter 112, and a radio frequency (RF)/digital to analog converter (DAC) module 114. Signal processing steps in an orthogonal frequency-division multiple access (referred to as 'OFDMA' hereinafter) transmitter can be described as follows. First, a bitstream is converted into a data symbol sequence. Bitstreams can be obtained through various signal processing such as channel encoding, interleaving, or scrambling applied to the data blocks transmitted from the medium access control (MAC) layer. A bitstream, so-called 'code-words,' is equivalent to a data block that is transmitted from the MAC layer. Next, such serial data symbol sequence is converted into N parallel data symbols (102). N data symbols are mapped to N sub-carriers that are allocated among the total of M sub-carriers, and the other remaining M-N sub-carriers are padded to 0 (106). The data symbols mapped to frequency domain are converted into a time domain sequence through the M-point inverse discrete Fourier transform (108). Later, OFDMA symbols are generated by adding cyclic prefix to the above-described time domain sequence in order to reduce inter-symbol interference (ISI) and inter-carrier interference (ICI) (110). The generated OFDMA symbols are converted into the serial format from the parallel format (112). Then, the OFDMA symbols are transmitted to the receiver through the processes such as digital-to-analog conversion, and frequency up-conversion (114). Available sub-carriers among the remaining M-N sub-carriers are allocated to the other users.

Next, an OFDMA receiver is comprised of a RF/ADC module 116, a serial-to-parallel converter 118, a cyclic prefix removing module 120, an M-point discrete Fourier transform (referred to as 'DFT' hereinafter) module 122, a sub-carrier demapping/equalization module 124, a parallel-to-serial converter 128, and a detection module 130. The signal processing steps of an OFDMA receiver is comprised of the signal processing steps of an OFDMA transmitter in a reverse manner.

Meanwhile, a SC-FDMA transmitter, when compared to the OFDMA transmitter, further includes an N-point DFT module 104 at the front end of the sub-carrier mapping module 106. The SC-FDMA transmitter, when compared to the OFDMA transmitter, can significantly reduce PAPR of the transmitted signal by distributing the multiple data into the frequency domain through the DFT before the IDFT processing. A SC-FDMA receiver, when compared to the OFDMA receiver, further includes an N-point IDFT module 126 added at the back end of the sub-carrier demapping module 124. The signal processing steps of an SC-FDMA receiver is comprised of the signal processing steps of an SC-FDMA transmitter in a reverse manner.

However, unlike OFDM, the transmitter transmits data to DC sub-carrier in a 3GPP LTE uplink. In this case, performance of the receiver is deteriorated due to the distortion of the data near the DC sub-carrier caused by the effect of the I/Q offset in the transmitter. To prevent this problem, in 3GPP LTE, SC-FDMA transmission is performed after shifting the frequency by $\Delta f/2$ which corresponds to the half of the sub-carrier spacing $\Delta f$, i.e. 15 KHz.

Figure 2:
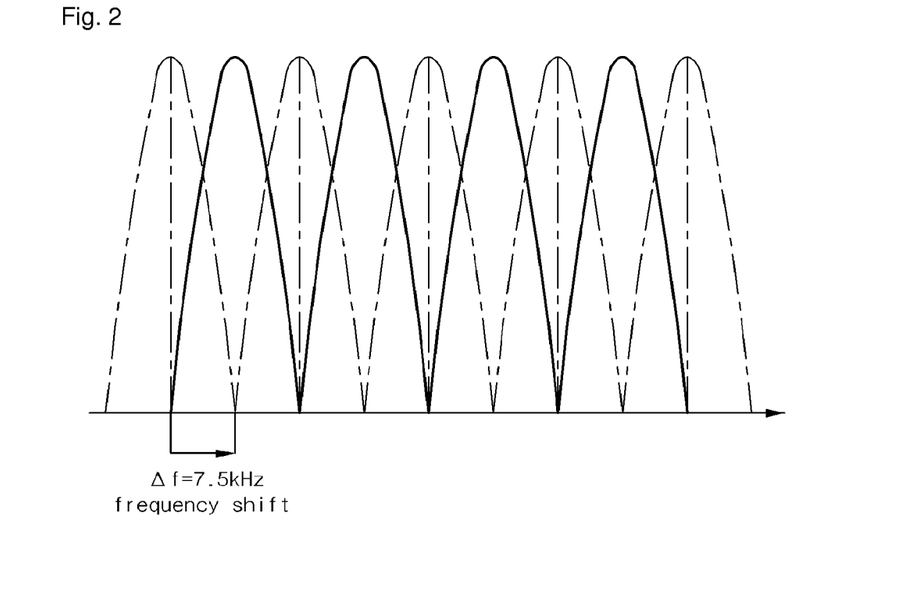
FIG. 2 illustrates a sub-carrier whose frequency is shifted by Δf/2 in the SC-FDMA transmitter.

FIG. 2 illustrates a sub-carrier whose frequency is shifted by $\Delta f/2$ at the SC-FDMA transmitter. As shown in FIG. 2, if the data is transmitted after shifting frequency by $\Delta f/2$ in the transmitter, the I/Q offset appears at the center of each sub-carrier since every sub-carrier frequency is shifted by $\Delta f/2$.

However, the sub-carriers whose frequencies are shifted by $\Delta f/2$ lost their periodicity, and the energy of each sub-carrier is leaked to all over the frequency band through fast Fourier transform (FFT). Moreover all the sub-carriers having I/Q offset interfere each other due to this energy leakage resulting in a serious performance deterioration because accurate measurement and cancellation of the I/Q offset become impractical.

DISCLOSURE OF INVENTION

Technical Problem

The present invention has been made to solve the foregoing problems and therefore it is an object of the present invention to provide an apparatus and a method for eliminating I/Q offset in a receiver of a SC-FDMA system which improves the performance of the system by accurately measuring and eliminating I/Q offset in a receiver of a SC-FDMA system operating in a 3GPP LTE/LTE-Advanced uplink.

Solution to Problem

An apparatus for eliminating I/Q offset in a receiver of the SC-FDMA system constituting the receiver of the SC-FDMA system includes:

a linear interpolation channel estimation unit for estimating channel using demodulation reference symbol (referred to as 'DMRS' hereinafter) that is a training sequence (X) corresponding to the discrete Fourier transformed signal (Y) that has passed through frame sync acquisition, frequency compensation and cyclic prefix elimination;

a signal regeneration/cancellation unit for calculating I/Q offset (D=Y−Y') by subtracting the discrete Fourier transformed signal (Y) from the ideal discrete Fourier transformed signal (Y'=H'X) generated by using channel coefficient (H'), that is an output of the linear interpolation channel estimation unit, and the DMRS that is the training sequence (X); and an I/Q offset measurement/cancellation unit for generating I/Q offset-free signal ($Y_{NoDC}$=Y−D') by subtracting I/Q offset (D') having corrected phase and power of the I/Q offset (D=Y−Y') from the discrete Fourier transformed signal (Y).

In the above-described configuration, it is characterized in that when the linear interpolation channel estimation unit estimates channel, to minimize the effect of I/Q offset, approximately ⅓ of left and right sides of the sub-carriers estimate channels using the least square method or minimum mean square error using DMRS that is the training sequence (X) while approximately ⅓ of the remaining sub-carriers estimate channels through linear interpolation using the estimated results from the least square method or minimum mean square error (referred to as 'MMSE' hereinafter).

Meanwhile, the I/Q offset measurement/cancellation unit is characterized in that it includes:

an I/Q offset power measurement unit for measuring power of the I/Q offset (D) by calculating average value of inverse discrete Fourier transformed I/Q offset ($D_{Time}$) obtained through inverse discrete Fourier transformed I/Q offset (D) by number of sub-carriers;

an I/Q offset regeneration unit comprising a phase comparator that generates complex sinusoids according to the ideal inverse discrete Fourier transformed I/Q offset ($D_{IdealTime}$) and adjusts its phase to the complex sinusoid of the inverse discrete Fourier transformed I/Q offset ($D_{Time}$), and a power comparator that corrects power of the ideal inverse discrete Fourier transformed I/Q offset ($D_{IdealTime}$) whose phase is corrected through the phase comparator, with the power of the inverse discrete Fourier transformed I/Q offset ($D_{Time}$); and an I/Q offset cancellation unit that transforms the inverse discrete Fourier transformed I/Q offset whose phase and power are corrected in the I/Q offset regeneration unit, into the frequency domain by discrete Fourier transform, and generates an I/Q offset (D') having corrected phase and power, then this I/Q offset (D') is subtracted from the discrete Fourier transformed signal (Y), that is $Y_{NoDC}$=Y−D', thereby eliminating the I/Q offset.

Furthermore, at the back end of the I/Q offset measurement/cancellation unit, the linear interpolation channel estimation unit, the signal regeneration/cancellation unit, and the I/Q offset measurement/cancellation unit which perform identical functions corresponding to the above-described linear interpolation channel estimation unit, signal regeneration/cancellation unit, and the I/Q offset measurement/cancellation unit may further be comprised of; and the back-end linear interpolation channel estimation unit among the above-described two linear interpolation channel estimation units can estimate channels by selecting a couple of sub-carriers near the DC sub-carrier as a linear interpolation interval.

The receiver of the SC-FDMA system may constitute a part of the base station in the 3GPP LTE/LTE Advanced uplink.

An I/Q offset cancellation method in the receiver of the SC-FDMA system according to the present invention includes the steps of:

(a) performing discrete Fourier transform of the signal that has been passed through frame sync acquisition, frequency correction, and cyclic prefix elimination;

(b) estimating channel coefficient (H') of the discrete Fourier transformed signal (Y) using the DMRS that is the training sequence (X);

(c) obtaining an I/Q offset (D=Y−Y') by subtracting the ideal discrete Fourier transformed signal (Y'=H'X) from the discrete Fourier transformed signal (Y), wherein the ideal discrete Fourier transformed signal (Y'=H'X) is generated using the channel coefficient (H') that was estimated in step (b), and the DMRS that is the training sequence (X);

(d) generating an I/Q offset (D') having corrected phase and power of the I/Q offset (D); and (e) generating a signal ($Y_{NoDC}$=Y−D') whose I/Q offset is eliminated by subtracting the I/Q offset (D') having corrected phase and power, from the discrete Fourier transformed signal (Y).

In the above-described configuration, step (b) is characterized in that approximately ⅓ of right and left sub-carriers estimate channels by the least square method or MMSE using DMRS that is training sequence (X) to minimize I/Q offset effect, while the remaining ⅓ of the sub-carriers estimate channels by linear interpolation using the results that are estimated by the least square method or MMSE.

The above-described step (d) is characterized in that it includes steps of:

(d1) measuring I/Q offset power by calculating average of inverse discrete Fourier transformed I/Q offset ($D_{Time}$) that is obtained through the inverse discrete Fourier transformed I/Q offset by number of the sub-carriers;

(d2) generating complex sinusoids according to the ideal inverse discrete Fourier transformed I/Q offset ($D_{IdealTime}$) and adjusting its phase to the complex sinusoid of the inverse discrete Fourier transformed I/Q offset ($D_{Time}$); and (d3) correcting power of the ideal inverse discrete Fourier transformed I/Q offset ($D_{IdealTime}$) whose phase is corrected through the step (d2), with the power of inverse discrete Fourier transformed I/Q offset ($D_{Time}$) that was measured in the step (d1).

The above-described step (e) is characterized in that an I/Q offset (D') having corrected phase and power, is generated by discrete Fourier transform and conversion of the inverse discrete Fourier transformed I/Q offset whose phase and power are corrected, into the frequency domain, then this I/Q offset (D') is subtracted from the discrete Fourier transformed signal (Y), that is $Y_{NoDC}$=Y−D', thereby eliminating the I/Q offset.

After completion of the above-described step (e), steps starting from the step (b) may be repeated one more time;

when repeating step (b), channels can be estimated by selecting a couple of sub-carriers near the DC sub-carrier as a linear interpolation interval.

It is characterized in that the receiver of the SC-FDMA system constitutes a part of the base station in the 3GPP LTE/LTE Advanced uplink.

Advantageous Effects of Invention

According to the apparatus and the method of the present invention for eliminating I/Q offset in a receiver of a SC-FDMA system, performance of the system can be improved by accurately measuring and eliminating I/Q offset in a receiver of a SC-FDMA system operating in a 3GPP LTE/LTE-Advanced uplink.

DESCRIPTION OF REFERENCE NUMERALS OF PRINCIPAL ELEMENTS IN THE DRAWINGS 231, 234: linear interpolation channel estimation unit,
232, 235: signal regeneration/cancellation unit,
233, 236: I/Q offset measurement/cancellation unit,
233a: I/Q offset power measurement circuit,
233b: I/Q offset regeneration circuit,
233c: I/Q offset cancellation circuit.

Mode for the Invention

Hereinafter an apparatus and a method of the present invention for eliminating I/Q offset in a receiver of a SC-FDMA system will be described in detail in with reference to the accompanying drawings.

Figure 3:
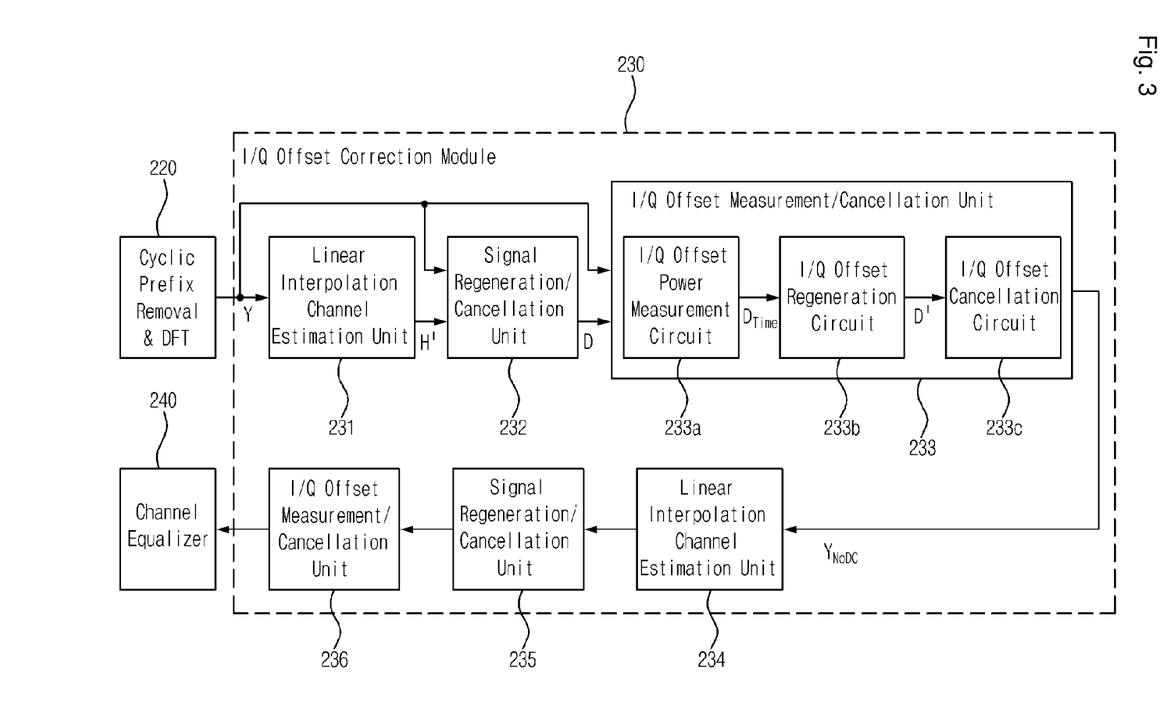
FIG. 3 is a functional block diagram of an I/Q offset measurement apparatus of the present invention in the receiver of a SC-FDMA system.

FIG. 3 is a functional block diagram of an I/Q offset measurement apparatus of the present invention in the receiver of a SC-FDMA system; it can be implemented using hardware, software, or combined configuration of these, and it can be disposed between the M-point DFT module 122 and the sub-carrier demapping/equalization module 124 in FIG. 1.

Meanwhile, although it is not shown in FIG. 1, in the receiver of the SC-FDMA system, especially in the receiver of the uplink of the 3GPP LTE, the frame sync of the LTE uplink is acquired first, and the frequency is shifted by −Δf/2 to move the frequency that is shifted by Δf/2 in the transmitter so as to correct the frequency error between the transmitter and the receiver.

Next, cyclic prefix is eliminated and DFT is performed. In the discrete Fourier transformed signal (Y), there is no interference among the sub-carriers since Δf/2 is restored and the frequency error between the transmitter and the receiver is corrected in the frequency offset correction unit (not shown here). However, since I/Q offset is located between the negative sub-carrier −1 and the DC sub-carrier, energy is leaked to all over the sub-carrier band when a signal having I/Q offset is discrete Fourier transformed, thereby causing interferences among the sub-carriers. To prevent such problem, the discrete Fourier transformed signal (Y) passes through the I/Q offset correction device comprising a linear interpolation channel estimation unit 231, a signal regeneration/cancellation unit 232, and an I/Q offset measurement/cancellation unit 233 as shown in FIG. 3.

In the above-described configuration, the linear interpolation channel estimation unit 231 estimates channels by the least square method, which is the most simple channel estimation method, or MMSE using the DMRS that is the training sequence (X) already known in the receiver. However, when the channels are estimated using the training sequence (X), accurate channel estimation becomes difficult because all the sub-carriers especially the ones near the DC sub-carriers are affected by I/Q offset. Therefore, when the channels are estimated, approximately ⅓ of right and left sub-carriers from the M sub-carriers estimate channels by the least square method or MMSE to minimize the I/Q offset effect, while the remaining ⅓ of the sub-carriers estimate channels by linear interpolation using the results estimated by the least square method or MMSE.

The channel coefficient (H') which is the output of the linear interpolation channel estimation unit 231, and the discrete Fourier transformed signal (Y) are inputted into the signal regeneration/cancellation unit 232. In the signal regeneration/cancellation unit 232, an ideal discrete Fourier transformed signal (Y'=H'X) is generated using DMRS that is already known training sequence (X). If this ideal discrete Fourier transformed signal (Y'=H'X) is subtracted from the discrete Fourier transformed signal (Y), only the I/Q offset (D=Y−Y') will be remained.

The I/Q offset (D), the output of the signal regeneration/cancellation unit 232, is inputted into the I/Q offset measurement/cancellation unit 233; the I/Q offset measurement/cancellation unit 233 can be divided into an I/Q offset power measurement circuit 233a, an I/Q offset regeneration circuit 233b, and an I/Q offset cancellation circuit 233c.

The I/Q offset power measurement circuit 233a, configured to measure the power of the I/Q offset (D) input, performs ideal discrete Fourier transformation of the I/Q offset (D) input by number of the sub-carriers. This ideal discrete Fourier transformed I/Q offset ($D_{Time}$) looks like a half periodic complex sinusoid mixed with noise due to the noise and the linear interpolation error of the channel coefficient that is estimated in the linear interpolation channel estimation unit 231; the average power of the complex sinusoid is the power of the received I/Q offset (D). The I/Q offset regeneration circuit 233b, configured to generate an I/Q offset without noise and channel estimation error, comprises a phase comparison circuit and a power comparison circuit.

First, the phase comparison circuit generates a complex sinusoid according to the ideal inverse Fourier transformed I/Q offset ($D_{Ideal\ Time}$) having frequency of −Δf/2 and with sampling frequency and time interval that are identical to the corresponding SC-FDMA system; in order to adjust initial phase of the complex sinusoid of the ideal inverse Fourier transformed I/Q offset ($D_{IdealTime}$) to the phase of the complex sinusoid of the inverse Fourier transformed I/Q offset ($D_{Time}$), the phase difference between the two signals is measured, then the phase of the ideal complex sinusoid is adjusted to that of the complex sinusoid of the inverse Fourier transformed I/Q offset ($D_{Time}$).

Next, the power comparison circuit calculates the power ratio between the power of the ideal inverse Fourier transformed I/Q offset ($D_{IdealTime}$) whose phase is corrected through the phase comparison circuit, and the power of the inverse Fourier transformed I/Q offset ($D_{Time}$) that is measured in the I/Q offset power measurement circuit 233a, then the power of the complex sinusoid of the ideal inverse Fourier transformed I/Q offset ($D_{IdealTime}$) is adjusted to the power of the inverse Fourier transformed I/Q offset ($D_{Time}$) Thus, an ideal I/Q offset in the time domain having no noise and channel estimation error is generated.

Meanwhile, since the signal is transformed into the frequency domain through the M-point DFT module 122, the I/Q offset must be removed in the frequency domain; for this purpose, previously generated ideal I/Q offset is discrete Fourier transformed and converted into the frequency domain (D'), thereafter I/Q offset can be rather accurately removed from the discrete Fourier transformed signal (Y) by subtracting the ideal discrete Fourier transformed I/Q offset (D') from the discrete Fourier transformed signal (Y) ($Y_{NoDC}$=Y−D') in the I/Q offset cancellation circuit 233c.

However, due to the channel estimation error through the linear interpolation channel estimation unit 231, accurate measurement and cancellation of I/Q offset becomes difficult if I/Q offset is very small; in this case, for enhancement of I/Q offset measurement performance, a linear interpolation channel estimation unit 234, a signal regeneration/cancellation unit 235, and an I/Q offset measurement/cancellation unit 236 may be added to the back end of the I/Q offset measurement and cancellation circuit 233, wherein the functions are identical to those of the linear interpolation channel estimation unit 234, a signal regeneration/cancellation unit 235, and an I/Q offset measurement/cancellation unit 236.

In this configuration, the I/Q offset-free signal ($Y_{NoDC}$), the output of the I/Q offset measurement/cancellation unit 233, is inputted into the linear interpolation channel estimation unit 234. Unlike the input signal of the previous linear interpolation channel estimation unit 231, this input signal is almost I/Q offset-free and the effect of I/Q offset is very small in estimating channels, therefore linear interpolation interval can be reduced from ⅓ of the existing sub-carriers to a couple of sub-carriers near the DC sub-carrier. Consequently the channel estimation error using linear interpolation can be significantly reduced. The output signal from the linear interpolation channel estimation unit 234 passes through the signal regeneration/cancellation unit 235 and the I/Q offset measurement/cancellation unit 236, so that I/Q offset can be measured accurately and I/Q offset-removed signal can be obtained.

Figure 4:
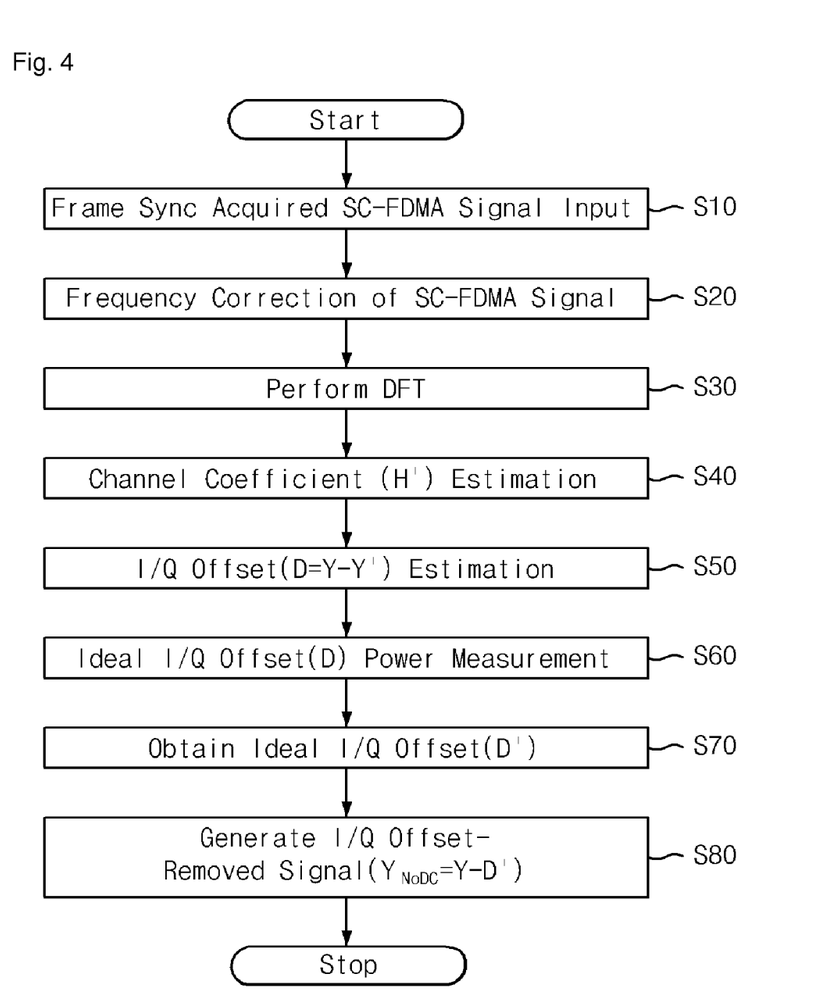
FIG. 4 is a flow diagram to describe an I/Q offset measurement method of the present invention in the receiver of a SC-FDMA system.

FIG. 4. is a flow diagram to describe an I/Q offset measurement method of the present invention in the receiver of a SC-FDMA system. As shown in FIG. 4, first, a SC-FDMA signal with acquired frame sync is received in step S10. Next, interferences among the sub-carriers are eliminated by restoring the frequency of the SC-FDMA signal by Δf/2 and correcting frequency error between the transmitter and the receiver in step S20.

The SC-FDMA signal whose frequency was corrected in step S20, is discrete Fourier transformed in step S30, then the channel coefficient (H') of this discrete Fourier transformed signal (Y) is estimated using the DMRS, that is the training sequence (X), and linear interpolation method in step S40.

In step S50, an ideal discrete Fourier transformed signal (Y'=H'X) is generated using the channel coefficient (H') that was estimated in step S40, and the training sequence (X); then the ideal discrete Fourier transformed signal (Y'=H'X) is subtracted from the discrete Fourier transformed signal (Y) to obtain the I/Q offset (D=Y−Y').

In step S60, the power of the I/Q offset (D) obtained in step S50, is measured; in step S70, an ideal I/Q offset (D') without noise and channel estimation error is generated using the I/Q offset power (D) measured in step S60.

Steps S60 and S70 can be described more in detail as follows.

First, in step S60, the I/Q offset (D) is inverse discrete Fourier transformed by number of the sub-carriers to measure the power of the I/Q offset (D). However, this inverse discrete Fourier transformed I/Q offset ($D_{Time}$) appears to have a shape of a half periodic complex sinusoid mixed with noise due to the noise and the linear interpolation error of the channel coefficient (H') that was estimated in step S40; the average power of this complex sinusoid becomes the power of the received I/Q offset.

Next, in step S70, a complex sinusoid according to the ideal inverse Fourier transformed I/Q offset ($D_{IdealTime}$) having frequency of −Δf/2 and with sampling frequency and time interval that are identical to the corresponding SC-FDMA system, is generated; in order to adjust initial phase of the complex sinusoid of the ideal inverse Fourier transformed I/Q offset ($D_{IdealTime}$) to the phase of the complex sinusoid of the inverse Fourier transformed I/Q offset ($D_{Time}$), the phase difference between the two signals is measured, then the phase of the ideal complex sinusoid is adjusted to that of the complex sinusoid of the inverse Fourier transformed I/Q offset ($D_{Time}$).

Next, the power ratio between the power of the ideal inverse Fourier transformed I/Q offset ($D_{IdealTime}$) having corrected phase, and the power of the inverse Fourier transformed I/Q offset ($D_{Time}$) that was measured in step S60, is calculated; then the power of the complex sinusoid of the ideal inverse Fourier transformed I/Q offset ($D_{IdealTime}$) is adjusted to the power of the inverse Fourier transformed I/Q offset ($D_{Time}$). Thus, an ideal I/Q offset having no noise and channel estimation error is generated.

Next, in step S80, the ideal I/Q offset, generated in step S70, is discrete Fourier transformed and converted into the frequency domain (D'); thereafter I/Q offset can be rather accurately removed from the discrete Fourier transformed signal (Y) by subtracting the ideal discrete Fourier transformed I/Q offset (D') from the discrete Fourier transformed signal (Y) ($Y_{NoDC}$=Y−D').

Meanwhile, due to the channel estimation error in step S40, accurate measurement and cancellation of I/Q offset becomes difficult if I/Q offset is very small; in this case, for enhancement of I/Q offset measurement performance it is desirable to repeat steps from S40 through the end. Since the I/Q offset-removed signal ($Y_{NoDC}$) is almost I/Q offset-free signal and the effect of I/Q offset is very small in estimating channels, therefore linear interpolation interval can be reduced from ⅓ of the existing sub-carriers to a couple of sub-carriers near the DC sub-carrier when estimating channel coefficient in step S40. Consequently the channel estimation error using linear interpolation can be significantly reduced.

Apparatus and method for I/Q offset cancellation in receiver of SC-FDMA system of the present invention is not limited by the above described exemplary embodiments, and various changes and modification may be made to the above described embodiments, without departing from the scope and spirit of the present invention.

INDUSTRIAL APPLICABILITY

The SC-FDMA system of the present invention can be applied to the uplink of the 3GPP LTE system, wherein the receiver constitutes a part of the equipment of the base station.

The invention claimed is:

1. An apparatus constituting a receiver for eliminating I/Q offset in the receiver of a SC-FDMA system comprising:
   a linear interpolation channel estimation unit estimating channel using DMRS that is a training sequence (X) corresponding to the discrete Fourier transformed signal (Y) that has passed through frame sync acquisition, frequency compensation and cyclic prefix elimination;
   a signal regeneration/cancellation unit calculating I/Q offset (D=Y−Y') by subtracting the discrete Fourier transformed signal (Y) from the ideal discrete Fourier transformed signal (Y'=H'X) created by using the channel coefficient (H'), that is an output of the linear interpolation channel estimation unit, and the DMRS that is the training sequence (X); and
   an I/Q offset measurement/cancellation unit generating I/Q offset-free signal ($Y_{NoDC}$=Y−D') by subtracting I/Q offset (D') having corrected phase and power of the I/Q offset (D=Y−Y') from the discrete Fourier transformed signal (Y).

2. The apparatus for eliminating I/Q offset in a receiver of a SC-FDMA system according to claim 1,
   wherein the linear interpolation channel estimation unit estimates channel, to minimize the effect of I/Q offset, approximately ⅓ of left and right sides of the sub-carriers estimate channels using the least square method or MMSE using DMRS that is the training sequence (X) while approximately ⅓ of the remaining sub-carriers estimate channels through linear interpolation using the estimated results from the least square method or MMSE.

3. The apparatus for eliminating I/Q offset in a receiver of a SC-FDMA system according to claim 2, wherein the linear interpolation channel estimation unit comprises;
   an I/Q offset power measurement unit for measuring power of the I/Q offset (D) by calculating average value of inverse discrete Fourier transformed I/Q offset ($D_{Time}$) obtained through inverse discrete Fourier transformed I/Q offset (D) by number of sub-carriers;
   an I/Q offset regeneration unit comprising a phase comparator that generates complex sinusoids according to the ideal inverse discrete Fourier transformed I/Q offset ($D_{IdealTime}$) and adjusts its phase to the complex sinusoid of the inverse discrete Fourier transformed I/Q offset ($D_{Time}$), and a power comparator that corrects power of the ideal inverse discrete Fourier transformed I/Q offset ($D_{IdealTime}$) whose phase is corrected through the phase comparator, with the power of the inverse discrete Fourier transformed I/Q offset ($D_{Time}$); and
   an I/Q offset cancellation unit that transforms the inverse discrete Fourier transformed I/Q offset whose phase and power are corrected in the I/Q offset regeneration unit, into the frequency domain by discrete Fourier transform, and generates an I/Q offset (D') having corrected phase and power, then this I/Q offset (D') is subtracted from the discrete Fourier transformed signal (Y), that is $Y_{NoDC}$=Y−D', thereby eliminating the I/Q offset.

4. The apparatus for eliminating I/Q offset in a receiver of a SC-FDMA system according to claim 3, further comprising a linear interpolation channel estimation unit, a signal regeneration/cancellation unit, and an I/Q offset measurement/cancellation unit which perform identical functions corresponding to the above-described linear interpolation channel estimation unit, signal regeneration/cancellation unit, and the I/Q offset measurement/cancellation unit at the back end of the I/Q offset measurement/cancellation unit,
   wherein the back-end linear interpolation channel estimation unit among the above-described two linear interpolation channel estimation units estimates channels by selecting a couple of sub-carriers near the DC sub-carrier as a linear interpolation interval.

5. The apparatus for eliminating I/Q offset in a receiver of a SC-FDMA system according to claim 1, wherein the receiver of the SC-FDMA system constitutes a part of the base station in the 3GPP LTE/LTE Advanced uplink.

6. A method for eliminating I/Q offset in a receiver of a SC-FDMA system comprising the steps of:
   (a) performing discrete Fourier transform of a signal that has been passed through frame sync acquisition, frequency correction, and cyclic prefix elimination;
   (b) estimating channel coefficient (H') of the discrete Fourier transformed signal (Y) using the DMRS that is the training sequence (X);
   (c) obtaining an I/Q offset (D=Y−Y') by subtracting the ideal discrete Fourier transformed signal (Y'=H'X) from the discrete Fourier transformed signal (Y), wherein the ideal discrete Fourier transformed signal (Y'=H'X) is generated using the channel coefficient (H') that is estimated in step (b), and the DMRS that is the training sequence (X);
   (d) generating an I/Q offset (D') having corrected phase and power of the I/Q offset (D); and
   (e) generating a signal ($Y_{NoDC}$=Y−D') whose I/Q offset is eliminated by subtracting the I/Q offset (D') having corrected phase and power, from the discrete Fourier transformed signal (Y).

7. The method for eliminating I/Q offset in a receiver of a SC-FDMA system according to claim 6, wherein step (b) is characterized in that approximately ⅓ of right and left sub-carriers estimate channels by the least square method or MMSE using DMRS that is training sequence (X) to minimize the I/Q offset effect, while the remaining ⅓ of the sub-carriers estimate channels by linear interpolation using the results that are estimated by the least square method or MMSE.

8. The method for eliminating I/Q offset in a receiver of a SC-FDMA system according to claim 7, characterized in that step (d) includes the steps of:
   (d1) measuring I/Q offset power by calculating average of inverse discrete Fourier transformed I/Q offset ($D_{Time}$) that is obtained through the inverse discrete Fourier transformed I/Q offset by number of the sub-carriers;
   (d2) generating complex sinusoids according to the ideal inverse discrete Fourier transformed I/Q offset ($D_{IdealTime}$) and adjusting its phase to the complex sinusoid of the inverse discrete Fourier transformed I/Q offset ($D_{Time}$); and
   (d3) correcting power of the ideal inverse discrete Fourier transformed I/Q offset ($D_{IdealTime}$) whose phase is corrected through the step (d2), with the power of inverse discrete Fourier transformed I/Q offset ($D_{Time}$) that is measured in the step (d1).

9. The method for eliminating I/Q offset in a receiver of a SC-FDMA system according to claim 8, wherein step (e) is characterized in that an I/Q offset (D') having corrected phase and power, is generated by discrete Fourier transform and conversion of the inverse discrete Fourier transformed I/Q offset whose phase and power are corrected, into the frequency domain, then this I/Q offset (D') is subtracted from the discrete Fourier transformed signal (Y), that is $Y_{NoDC}$=Y−D', thereby eliminating the I/Q offset.

10. The method for eliminating I/Q offset in a receiver of a SC-FDMA system according to claim 6, characterized in that after completion of the above-described step (e), steps starting from the step (b) may be repeated one more time; when repeating step (b), channels can be estimated by selecting a couple of sub-carriers near the DC sub-carrier as a linear interpolation interval.

11. The method for eliminating I/Q offset in a receiver of a SC-FDMA system according to claim 6, characterized in that the receiver of the SC-FDMA system constitutes a part of the base station in the 3GPP LTE/LTE Advanced uplink.

12. The apparatus for eliminating I/Q offset in a receiver of a SC-FDMA system according to claim 2, wherein the receiver of the SC-FDMA system constitutes a part of the base station in the 3GPP LTE/LTE Advanced uplink.

13. The apparatus for eliminating I/Q offset in a receiver of a SC-FDMA system according to claim 3, wherein the receiver of the SC-FDMA system constitutes a part of the base station in the 3GPP LTE/LTE Advanced uplink.

14. The apparatus for eliminating I/Q offset in a receiver of a SC-FDMA system according to claim 4, wherein the receiver of the SC-FDMA system constitutes a part of the base station in the 3GPP LTE/LTE Advanced uplink.

15. The method for eliminating I/Q offset in a receiver of a SC-FDMA system according to claim 7, characterized in that the receiver of the SC-FDMA system constitutes a part of the base station in the 3GPP LTE/LTE Advanced uplink.

16. The method for eliminating I/Q offset in a receiver of a SC-FDMA system according to claim 8, characterized in that the receiver of the SC-FDMA system constitutes a part of the base station in the 3GPP LTE/LTE Advanced uplink.

17. The method for eliminating I/Q offset in a receiver of a SC-FDMA system according to claim 9, characterized in that the receiver of the SC-FDMA system constitutes a part of the base station in the 3GPP LTE/LTE Advanced uplink.

18. The method for eliminating I/Q offset in a receiver of a SC-FDMA system according to claim 10, characterized in that the receiver of the SC-FDMA system constitutes a part of the base station in the 3GPP LTE/LTE Advanced uplink.

* * * * *